US012625942B2

(12) United States Patent (10) Patent No.: US 12,625,942 B2

Sikorski (45) Date of Patent: May 12, 2026

(54) ENABLING NETWORK INTERFACES ON MOBILE DEVICES BY MEANS OF USERSPACE IP STACK

(71) Applicant: DittoLive Incorporated, San Francisco, CA (US)

(72) Inventor: Aaron Paul Sikorski, Old Lyme, CT (US)

(73) Assignee: Dittolive Incorporated, San Francisco, CA (US)

(*) Notice: Subject to any disclaimer, the term of this patent is extended or adjusted under 35 U.S.C. 154(b) by 43 days.

(21) Appl. No.: 18/670,366

(22) Filed: May 21, 2024

(65) Prior Publication Data

US 2024/0394355 A1 Nov. 28, 2024

Related U.S. Application Data

(60) Provisional application No. 63/503,756, filed on May 23, 2023.

(51) Int. Cl.
G06F 21/44 (2013.01)
G06F 9/54 (2006.01)
H04L 69/324 (2022.01)

(52) U.S. Cl.
CPC .............. G06F 21/44 (2013.01); G06F 9/547 (2013.01); H04L 69/324 (2013.01)

(58) Field of Classification Search
CPC ......... G06F 21/44; G06F 9/547; H04L 69/324
See application file for complete search history.

(56) References Cited

U.S. PATENT DOCUMENTS

| | | | | |
|---|---|---|---|---|
| 8,549,173 B1 * | 10/2013 | Wu | ....................... | G06F 9/5016 |
| | | | | 709/238 |
| 8,959,611 B1 | 2/2015 | Mncent et al. | | |
| 10,846,244 B1 * | 11/2020 | Amani | ..................... | H04L 9/30 |
| 2001/0044904 A1 * | 11/2001 | Berg | .................. | G06F 21/6218 |
| | | | | 726/26 |
| 2003/0041118 A1 | 2/2003 | Elnozahy et al. | | |
| 2004/0057458 A1 * | 3/2004 | Kil | ........................ | H04L 69/161 |
| | | | | 370/466 |

(Continued)

OTHER PUBLICATIONS

Alexandrov et al., University of California at Santa Barbara, "Ufo: A Personal Global File System Based on User-Level Extensions to the Operating System", ACM Transactions on Computer Systems, vol. 16, No. 3, Aug. 1998, pp. 207-233.

(Continued)

*Primary Examiner* — Mohamed A. Wasel
(74) *Attorney, Agent, or Firm* — Workman Nydegger

(57) ABSTRACT

System and method that enable a userspace compartmented IP Stack and network interfaces between a user device and communications devices associated with the user device, including mobile devices. The system and method include userspace bridging of data to/from external communications devices and applications onboard the user device. The system and method include userspace control of the network interfaces, routing between disparate IP networks, and routing of external IP network interfaces into user device interfaces. The system and method includes incorporating userspace device drivers required for external network hardware interface.

20 Claims, 10 Drawing Sheets

(56)  References Cited

U.S. PATENT DOCUMENTS

2020/0379925 A1* 12/2020 Andrus .................. G06F 9/546

OTHER PUBLICATIONS

Brunette et al., Department of Computer Science & Engineering, University of Washington, "Open Data Kit Sensors: A Sensor Integration Framework for Android at the Application-Level", Mobysis'12—Proceedings of the 10th International Conference on Mobile Systems, Applications, and Services, Jun. 25-29, 2012, Low Wood Bay, Lake District, UK, pp. 351-364.

Zhauniarovich, Y., "Android Security (and Not) Internals", 2016, XP055432388, retrieved from the Internet: URL: http://www.zhauniarovich.com/files/asani/asani.pdf, [retrieved on Dec. 16, 2017], 63 pages.

Mühlenbrock, Martin (Authorized Officer), International Search Report and Written Opinion issued in International Application No. PCT/US2024/030372 on Sep. 10, 2024, 14 pages.

* cited by examiner

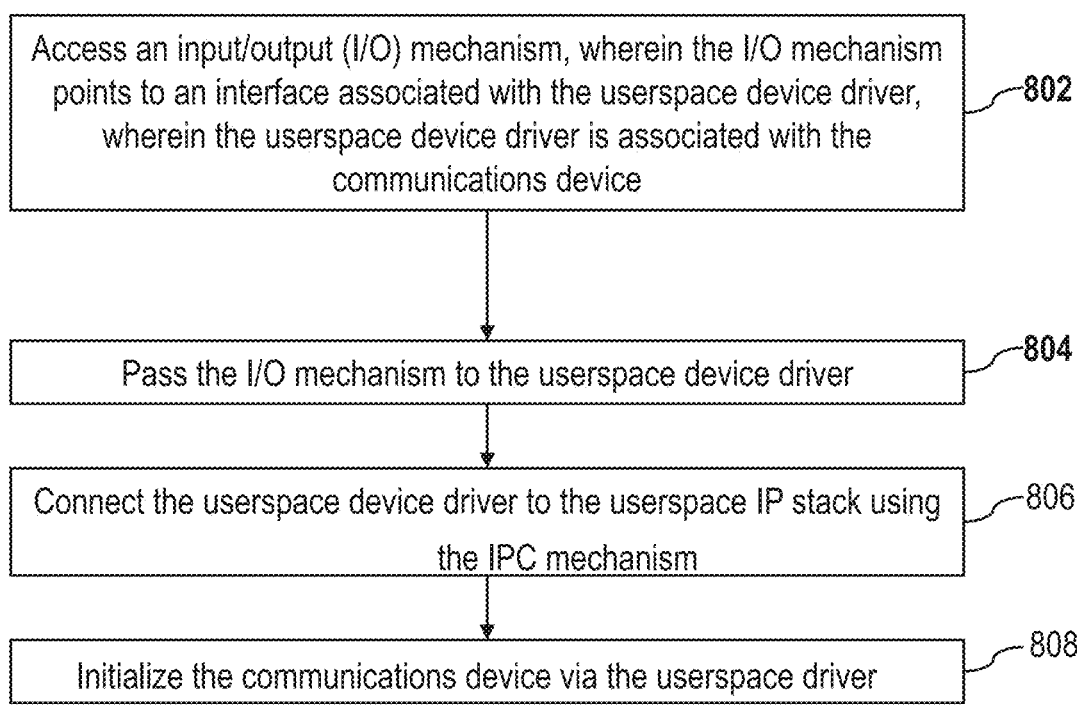

800

Access an input/output (I/O) mechanism, wherein the I/O mechanism points to an interface associated with the userspace device driver, wherein the userspace device driver is associated with the communications device — 802

Pass the I/O mechanism to the userspace device driver — 804

Connect the userspace device driver to the userspace IP stack using the IPC mechanism — 806

Initialize the communications device via the userspace driver — 808

FIG. 8

ENABLING NETWORK INTERFACES ON MOBILE DEVICES BY MEANS OF USERSPACE IP STACK

CROSS REFERENCE TO RELATED APPLICATIONS

This application claims the priority and benefit of U.S. Provisional Application No. 63/503,756, filed on May 23, 2023, which is hereby incorporated by reference in its entirety.

FIELD OF THE INVENTION

Various embodiments in accordance with the present disclosure relate to communications between a user device, (sometimes referred to herein as an end user device (EUD); such as, for example, but not limited to, a mobile computing device, a smart phone, a tablet, or the like), and wired or wireless network communication device(s). Embodiments include, but are not limited to including, an EUD which connects to a networked communications device such as, for example, but not limited to, a BLUETOOTH® device, an ultra-wideband (UWB) device, a universal serial bus (USB) device, a near field communication (NFC) device, or the like.

BACKGROUND

In the current state of the art, original equipment manufacturers (OEMs), such as, for example, but not limited to, manufacturers of ANDROID® user devices, and software/hardware/firmware developers for these OEMs include network communications device support in the operating system of the device. There is a plurality of network device configurations, and the OEMs can build in drivers for these communications devices to enable communication. The OEM may also make modifications to the operating system kernel, as well as modifications to a userspace interface, to manage the network devices. These things cannot, however, ordinarily be done by a user or an application developer because the OEM does not allow users and application developers to modify the operating system kernel, etc.

What are needed are a system and method for enabling communications between an EUD and a communications device in userspace without requiring access to the operating system kernel.

SUMMARY

The system and method in accordance with embodiments of the present disclosure enable a network interface, which may include routing, by using built-in, user-accessible, operating system features, such as, for example, but not limited to, application programming interfaces (APIs), to control hardware (e.g., communications devices), without requiring OEM-level changes to operating system components.

The system in accordance with embodiments of the present disclosure includes a novel, inventive, userspace application executing on an EUD that replaces operating system component modifications, specifically adding and/or modifying drivers, and enables access to operating system tools. The userspace application is granted the permissions to provide the network interface, without requiring operating system-level permissions. In an aspect, the userspace application includes a userspace IP stack, a userspace device driver, and an interprocess communications mechanism (IPC) which accepts the communications packet traffic being sent to and received from an EUD's conventional user application(s), (e.g., application downloaded from Google® Play Store or the like). In various implementations, the novel userspace application routes the communications packet traffic to the conventional user applications via the IPC, which transmits the packet traffic to a communications device(s), (e.g., a network device) connected via the userspace IP Stack. In an aspect, the IPC reflects the communications packet traffic into the userspace IP stack. In an aspect, the user application, in accordance with embodiments of the present disclosure, acts as a network router for the user application using its internal IP Stack, and acts as a network router for network devices. In an aspect, multiple communication channels and/or networks are supported via the userspace IP Stack.

A method in accordance with embodiments of the present disclosure establishes, using, for example, an applications programming interface (API), a link between an EUD user application and the EUD's communications device/hardware. In an aspect, the link includes a wired connection or port or a wireless connection or port. The method includes, but is not limited to including, associating the link with a userspace device driver, which establishes communications between the user application and the EUD's communications device. The method further includes encoding and decoding, by the userspace device driver, protocol information. Thus, a plurality of proprietary protocols, for example, but not limited to, ASIX™, REALTEK®, and others, and open standards protocols, such as, for example, but not limited to, communication device class/Ethernet control module (CDC-ECM), CDC-Ethernet emulation module (EEM), CDC-network control module (NCM), remote network driver interface specification (RNDIS), and point-to-point protocol (PPP), are supported. In an aspect, the userspace device driver is contained in, accessed by, or otherwise associated with, a novel userspace application. In an aspect, a service that resides on the user device awaits communications traffic from a peripheral communications device and forwards this traffic to the userspace IP stack described herein. Such a configuration integrates together the userspace IP stack, the peripheral communications device's interface such as, for example, but not limited to, a USB, and the IPC mechanism of the present disclosure.

In various embodiments, the IPC mechanism refers to the means by which various instances of executing programs exchange data and coordinate with each other within a computer system (e.g., user device), enabling communication and synchronization between processes running concurrently on the same or different computers. IPC mechanisms include, but are not limited to, pipes, sockets, message queues, shared memory, and remote procedure calls (RPCs). Pipes provide a unidirectional communication channel between two related processes. One process writes data to the pipe, and the other reads it. Pipes can be either anonymous or named. Sockets provide bidirectional communication channels between processes over a network. They allow processes to communicate with each other, either on the same machine or across a network. Message queues allow processes to communicate by sending messages to each other. Messages are stored in queues and can be accessed by multiple processes. The message queue provides a way for processes to exchange data asynchronously. Shared memory allows multiple processes to access a common area of memory, enabling communication between processes in which data can be written and read directly from memory without the need for copying. Remote procedure calls (RPCs) allow a first process to execute procedures or functions in another process address space, as if the execution were local to the first process. RPCs abstract communication details between processes, and provide a way for processes to call functions across a network. For example, an ANDROID® user device provides a Binder IPC and an APPLE® user device provides an XPC IPC. These IPC mechanisms are enabling for ANDROID® and APPLE® user devices, respectively, and provide ways for processes to communicate and coordinate with each other, enabling the development of complex and distributed systems. The choice of an IPC mechanism depends on factors such as system performance, communication patterns, and platform compatibility.

In an aspect, the IPC mechanism in accordance with embodiments of the present disclosure includes a proxy server, a userspace library or an application including the IP stack, and a novel userspace IP stack in accordance with embodiments of the present disclosure accommodates userspace device drivers (e.g., for communications devices) in the EUD's userspace. In an aspect, when a peripheral communications device is included in the user-device, systems and methods in accordance with embodiments of the present disclosure provide router functionality in the form of a network router with a compartmented userspace IP stack that executes on a user device in userspace without using superuser commands or having root access. In an aspect, an API call making use of user privileges provides access to, for example, but not limited to, USB, BLUETOOTH®, and/or NFC interfaces for communications devices, or anything else that the IP stack can be connected to for providing a device driver, executing as a net daemon.

In some aspects, the method includes translating, by the userspace device driver, communications packets into packets that can be piped into a userspace internet protocol (IP) stack. Various drivers may perform differently, but the generalized flow disclosed herein is to/from a userspace device driver to/from the userspace IP stack. For example, when data are read from a USB peripheral communications device, the header and footer locations are found and removed based on pre-defined format information for that particular peripheral communications device, and the data are passed, as a complete data packet, or combined with other incoming data packets, to the userspace IP stack. The device driver protocol specifications specify the pre-defined format, in various aspects.

At this point in various implementations, there is connectivity between the EUD and the peripheral communications device, and the communications packet protocol information is being decoded and sent into a userspace IP stack which resides within the userspace application. The data within the communications packet become useable when the userspace IP stack interfaces via the IPC mechanism to another application. In an aspect, IPC mechanisms as described herein can be used to communicate with an application outside of the user device. For example, an IPC mechanism that can be used is an EUD socket library. The socket library can be used to move data to the userspace IP stack.

A system of one or more computers (e.g., a user device such as a smart phone) can be configured to perform particular processes, methods, operations or actions by virtue of having software, firmware, hardware, or a combination of them installed on the system that in operation causes or cause the system to perform the actions. One or more computer programs can be configured to perform particular methods, operations or actions by virtue of including instructions that, when executed by data processing apparatus, cause the apparatus to perform the actions. One general aspect includes a method for enabling a user-level interface between a communications device and a user application executing on a user device via or using a novel userspace application that includes a userspace internet protocol (IP) stack, a userspace device driver, and an interprocess communication (IPC) mechanism. The method includes accessing an input/output (I/O) mechanism, where the I/O mechanism points to an interface associated with the userspace device driver, where the userspace device driver is associated with the communications device. The method also includes passing the I/O mechanism to the userspace device driver. The method also includes connecting the userspace device driver to the userspace internet protocol (IP) stack using the IPC mechanism. The method also includes initializing the communications device. Other embodiments of this aspect include corresponding computer systems, apparatus, and computer programs recorded on one or more computer storage devices, each configured to perform the actions, operations, and functions of the methods.

Implementations may include one or more of the following features. The method may include requesting a first permission to access the communications device. The method may include using an applications programming interface to request the first permission from an operating system managing an execution of the user application. The method may include receiving, from a user, an approval or a denial of access to the communications device. The method may include receiving a notification that the communications device is attached to the user device. The method may include requesting a second permission to use the communications device when the user application includes a device driver for the communications device. The method may include starting a process or thread including the userspace device driver. The connection information includes parameters used to establish an IP link between the communications device and the user device. The I/O mechanism may include a file descriptor. Implementations of the described techniques may include hardware, a method or process, or computer software on a computer-accessible medium.

One general aspect includes a system for enabling a user-level network interface between a communications device and a user device a userspace application executing on the user device, the userspace application including a userspace internet protocol (IP) stack, a userspace device driver, and an interprocess communication (IPC) mechanism, where the userspace application includes instructions to perform operations including accessing an input/output (I/O) mechanism, where the I/O mechanism points to an interface associated with the userspace device driver, where the userspace device driver is associated with the communications device. The operations include passing the I/O mechanism to the userspace device driver, connecting the userspace device driver to the userspace IP stack using the IPC mechanism, and initializing the communications device. Other embodiments of this aspect include corresponding computer systems, apparatus, and computer programs recorded on one or more computer storage devices, each configured to perform the actions of the methods.

Implementations may include one or more of the following features. The system may include a router configured to intercept communications packets transmitted by a user application. The userspace application is configured to access the communications device using an applications programming interface (API) configured to enable control of the communications device. The operations further may include ingesting a packet into the userspace application via the IPC mechanism, moving the packet into the userspace IP stack, preparing, by the userspace IP stack, the packet for transmission by the communications device, and moving the prepared packet to the userspace device driver configured to transmit the packet over a physical link associated with the communications device. The userspace application executes at a user-level without requiring non-user-level permissions. The operations further may include reading, by the communications device, a packet using the userspace device driver, forming a data link layer frame including data link layer encapsulation from the packet, pushing the data link layer frame onto the userspace IP stack, determining a data payload by removing the data link layer encapsulation from the packet, and transmitting the data payload to a consumer of the data payload. The operations further may include transmitting the data payload using the userspace IPC mechanism. Implementations of the described techniques may include hardware, a method or process, or computer software on a computer-accessible medium.

One general aspect includes a computer-readable medium storing instructions for enabling a user-level interface between a communications device and a user application executing on a user device. The instructions include accessing an input/output (I/O) mechanism, where the I/O mechanism points to an interface associated with the userspace device driver, where the userspace device driver is associated with the communications device. The instructions include passing the I/O mechanism to the userspace device driver, connecting the userspace device driver to the userspace IP stack using the IPC mechanism, and initializing the communications device via the userspace device driver. Other embodiments of this aspect include corresponding computer systems, apparatus, and computer programs recorded on one or more computer storage devices, each configured to perform the actions of the methods.

Implementations may include one or more of the following features. The instructions may include ingesting a packet into the userspace application via the IPC mechanism, moving the packet into the userspace IP stack, preparing, by the userspace IP stack, the packet for transmission, and moving the prepared packet to the userspace device driver configured to transmit the packet over a physical link associated with the communications device. The userspace application executes at a user-level without requiring non-user-level permissions. The instructions may include reading, by the communications device, a packet from a physical link using the userspace device driver, forming a data link layer frame including data link layer encapsulation from the packet, pushing the data link layer frame onto the userspace IP stack, determining a data payload by removing the data link layer encapsulation from the packet, and transmitting the data payload to a consumer of the data payload. The instructions may include transmitting the data payload using the userspace IPC mechanism. The userspace application is configured to access the communications device using an applications programming interface (API) configured to enable control of the communications device. Implementations of the described techniques may include hardware, a method or process, or computer software on a computer-accessible medium.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 8 is a flowchart of a method for enabling a user-level interface between a communications device and a user application executing on a user device in accordance with embodiments of the present disclosure.

DETAILED DESCRIPTION

Figure 1:
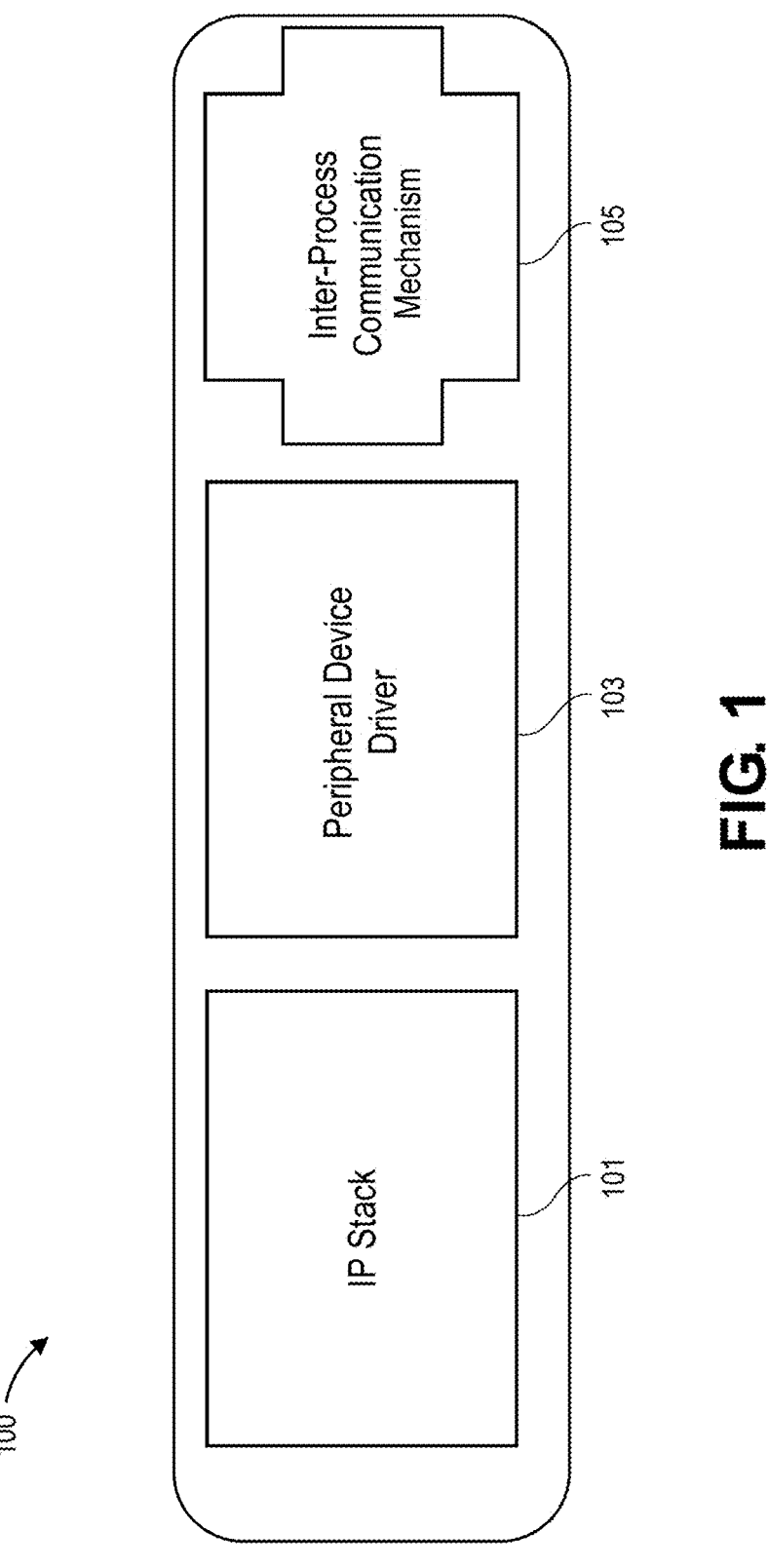
FIG. 1 is a schematic block diagram of an example of a single userspace service design showing an IP stack and device driver contained within a userspace application.

Embodiments in accordance with the present disclosure will hereafter be described with reference to the accompanying drawings, wherein like reference numerals denote like elements. It should be understood that the accompanying drawings illustrate only the various implementations described herein and are not meant to limit the scope of various technologies described herein. The drawings show and describe various embodiments of the current disclosure.

The following description of various typical aspect(s) is merely descriptive in nature and is in no way intended to limit the disclosure, its application, or uses.

Referring now to FIG. 1, shown is an overall architecture in accordance with embodiments of the present disclosure. In some configurations, the architecture 100 is a single userspace application containing a userspace IP Stack 101, userspace device drivers 103, and a userspace IPC mechanism 105 that is located in the user space of a user device, such as a smartphone, etc.

In some configurations, the IPC mechanism 105 provides utilization of network functionality in the userspace to other applications, e.g. user applications, executing on the EUD (not shown in FIG. 1). In some configurations (not shown in FIG. 1), a system for enabling a user-level network interface can include, but is not limited to including, an internet protocol (IP) stack 101, an IPC mechanism 105, and a user application (not shown in FIG. 1) configured to receive packets from the IPC mechanism 105. The userspace application is configured to transmit the packets to, for example, but not limited to, a communications device, such as a radio transport device, through a userspace device driver for the radio transport device.

In some configurations, the IP Stack 101 of the userspace application provides low level networking functionality including, for example, but not limited to, PPP, Ethernet (Etharp, Layer 2 Framing, Layer 2 Multicast etc.), internet protocol (IP)v4, IPv6, user datagram protocol (UDP) Send/ Receive, transmission control protocol (TCP) Send/Receive, internet control message protocol (ICMP) send/receive, multicast send/receive, IP routing, and IEEE 802.11D bridge.

The Open Systems Interconnection (OSI) model defines a conceptual framework for understanding and designing network protocols. It includes seven layers, each responsible for different aspects of network communication. Layer 1 is a physical layer that deals with the physical connection between devices and the transmission of raw data over the network medium. Examples include cables, connectors, hubs, repeaters, and network interface cards (NICs). In the context of the IP stack 101, Layer 1 is responsible for transmitting raw binary data (bits) over the physical medium. Layer 2 is the data link layer that handles the transmission of data frames between adjacent nodes over a physical medium. Examples include PPP and Ethernet. Layer 2 provides error detection and correction, flow control, and access to the physical medium. In the IP stack, layer 2 encapsulates IP packets into data frames and performs functions such as media access control (MAC) addressing and framing. Layer 3, where the internet protocol operates, is responsible for routing packets from the source to the destination across multiple network segments. Layer 3 provides logical addressing, routing, fragmentation, and error handling. Examples of network layer protocols include IP, ICMP, and Internet Group Management Protocol (IGMP). In the IP stack 101, layer 3 encapsulates data into IP packets, adds IP addresses (source and destination), and determines a path for packet delivery based on routing tables. Together, layers 1, 2, and 3 form the foundation of the IP stack 101, enabling communication.

A peripheral device driver 103 of the userspace application includes, but is not limited to including, RNDIS, ASIX™, PPP, CDC/ECM, CDC/NCM, CDC/EEM, CDC/ Serial, other USB-Ethernet drivers (REALTEK®, WIN-LINK®), and BLUETOOTH® (personal area network (PAN), dial-up networking (DUN)) drivers. The userspace application executes at a user level without requiring privileged operating system permissions. In other words, in systems and methods in accordance with embodiments of the present disclosure, the ability to create a network interface on an operating system, and an associated routing table, to use the network interface for communications traffic does not require privileged operating system permission.

A non-privileged application, (e.g., a user application or a userspace application as described herein), has restricted access rights to certain data, resources, and operations. Restricted access rights prevent non-privileged applications from performing some operations or accessing some system resources. For example, non-privileged applications may not have permission to modify system files, access hardware devices directly, or execute some system-level commands. Non-privileged applications typically run in the context of a regular user account rather than with administrative privileges. As a result, they are subject to the access control policies and permissions assigned to the user account under which they are executed. Non-privileged applications are subject to security constraints imposed by the operating system to prevent unauthorized access or malicious activities. These constraints may include restrictions on file system access, network communication, inter-process communication, and memory management. Non-privileged applications operate in a safe execution environment that isolates them from system-level operations and other privileged processes. This isolation helps prevent non-privileged applications from inadvertently interfering with system functions, (e.g., operating system functions), or causing system instability. User applications such as web browsers, media players, text editors, and productivity tools are non-privileged applications.

Userspace is the memory area of a user device, (e.g., a smart phone), where user-level applications and processes run. Userspace programs/applications interact with the operating system through system calls and other interfaces provided by the kernel. Applications running in userspace have limited access to system resources and hardware. Examples of user-level applications include word processors, web browsers, media players, and other software that users directly interact with. User-level programs are isolated from system-level operations, so that accessing and manipulating programs and data in the userspace have a lower risk of destabilizing the system than accessing and manipulating programs and data in kernel space.

Kernel space is where the operating system's kernel and core system services reside. Kernel space includes the operating system kernel, conventional device drivers, file systems, and system services. Kernel code runs in privileged mode and has direct access to hardware and system resources. The division between userspace and kernel space ensures that user-level applications operate within a controlled environment and do not have direct access to privileged system resources. System stability and security are maintained by restricting access to kernel space and enforcing separation between userspace and kernel space. Userspace and kernel space are two distinct memory areas in an operating system's memory management scheme. They represent different levels of privilege and accessibility for software components running on the system. Kernel space is the memory area where the operating system services reside. The kernel has privileged access to system resources and hardware, allowing it to perform operations such as managing memory, scheduling tasks, and handling hardware interrupts. Conventional device drivers, file systems, and other low-level system components typically run in kernel space. Errors or bugs in kernel code can lead to system crashes or security vulnerabilities. Access to kernel space is restricted to prevent user-level programs from directly accessing or modifying kernel memory, which could compromise system stability and security. In summary, userspace is where user-level applications execute, while kernel space is where privileged applications, e.g., the operating system's kernel and some system services, reside. In general, the kernel maintains control over hardware and system-level operations. In contrast, a system in accordance with embodiments of the present disclosure uses user-level applications and operations to control communications devices (e.g., a wifi card or subsystem, a BLUETOOTH® card or subsystem, a USB port, etc.) and send/receive/process communications data. The IPC mechanism 105 supports, but is not limited to supporting, creating and managing a software-defined network in accordance with embodiments of the present disclosure. Interface hardware such as, for example, a printed circuit board, enables the physical connection. A communications IP stack 101 in accordance with embodiments of the present disclosure makes it possible to communicate in userspace. A user device (e.g., a smart phone, a tablet, a laptop, or the like), can be used as a router that interfaces with its network drivers, where the control is executed in userspace. A router connects two or more packet-switched networks or subnetworks. A router forwards data packets to their intended IP addresses, and allows multiple devices to use the same Internet connection. For example, a router can access a list of paths to various network destinations, reading a packet's header to determine where it is going, using the list to determine a path to the destination, and forwarding the packet to the next network in the path. Like virtual private network (VPN), local host reflector technology, and proxy, the IPC mechanism 105 in accordance with embodiments of the present disclosure captures incoming and outgoing communications messages and provides the data from those messages to an IP stack 101 in accordance with embodiments of the present disclosure. A core component of a system in accordance with embodiments of the present disclosure is a separate compartmented IP stack 101 that stores modified packets, and provides a bridge for moving packets among disparate connected networks. In various embodiments, the system provides multiple methods for ingesting of packets and controlling of packets for routing and packet modification. Packets come into the system having a pre-defined format, and leave the system having another wrapper.

Figure 2:
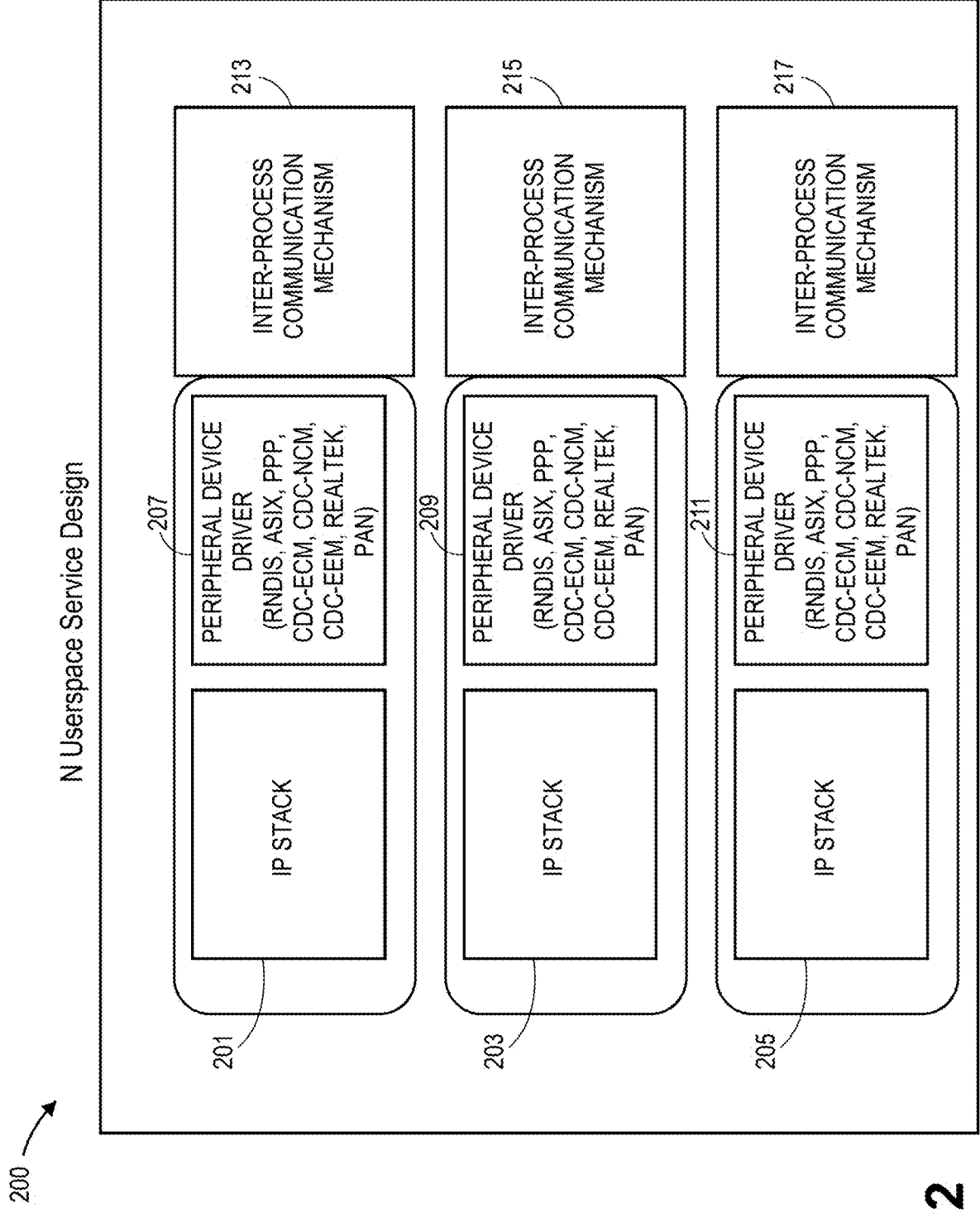
FIG. 2 is a schematic block diagram of an example of an n-userspace service design showing N number of device drivers used for multiple device integration.

Referring now to FIG. 2, other embodiments in accordance with the present disclosure include a multiple userspace service design 200 in which the architecture 100 (FIG. 1) is replicated as shown, for example, but not limited to, in FIG. 2. IP stacks 201/203/205 provide low level networking functionality for userspaces 1/2/3 respectively. Peripheral device drivers 207/209/211 enable communications between an EUD application and a network communications device for the shown userspaces respectively. IPC mechanisms 213/215/217 provide network functionality in the shown userspaces to other applications executing on the EUD.

Figure 3A:
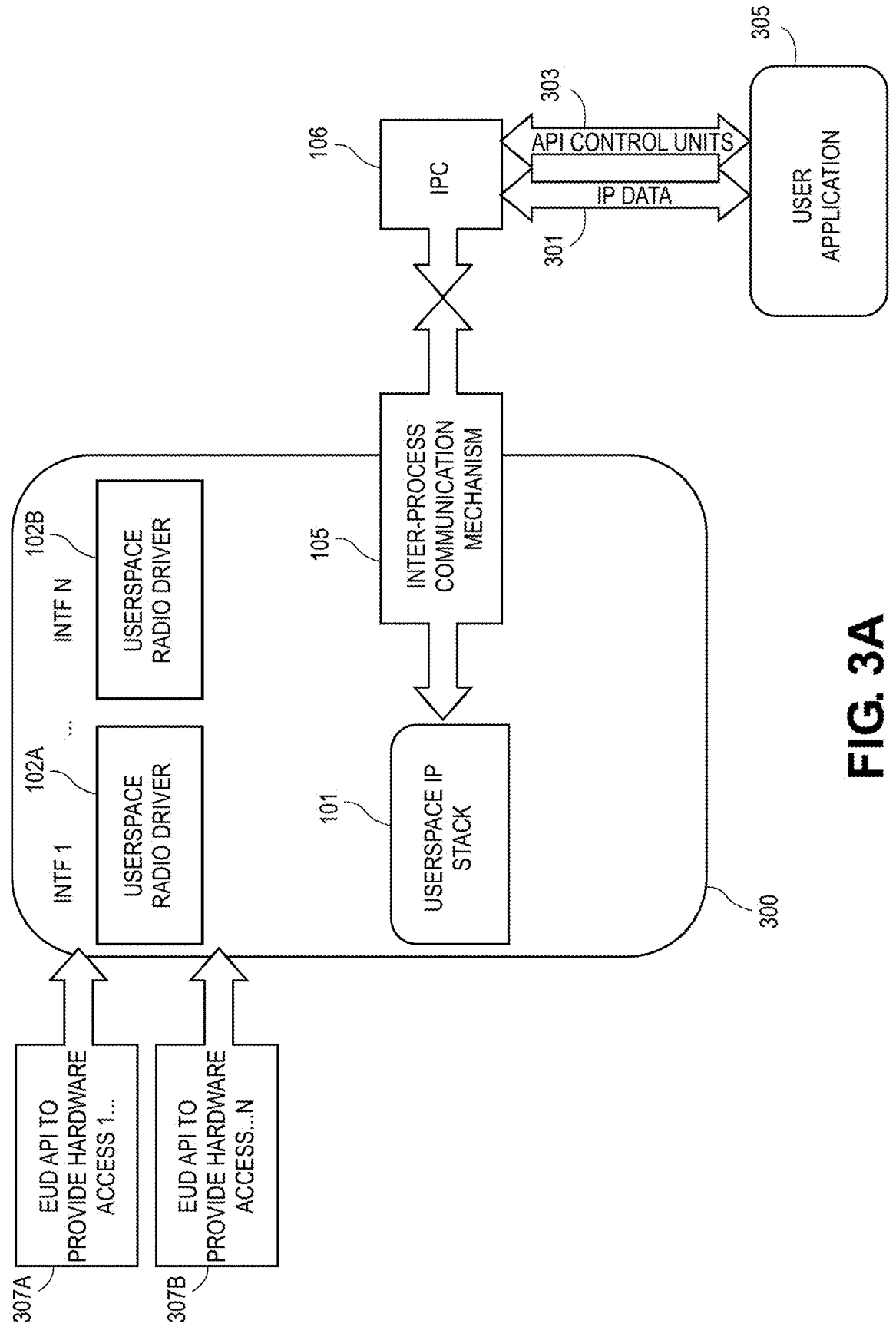
FIGS. 3A-3C are schematic block diagrams of an application in accordance with embodiments of the present disclosure in which packets are arriving into and departing from the described userspace application.
Figure 3B:
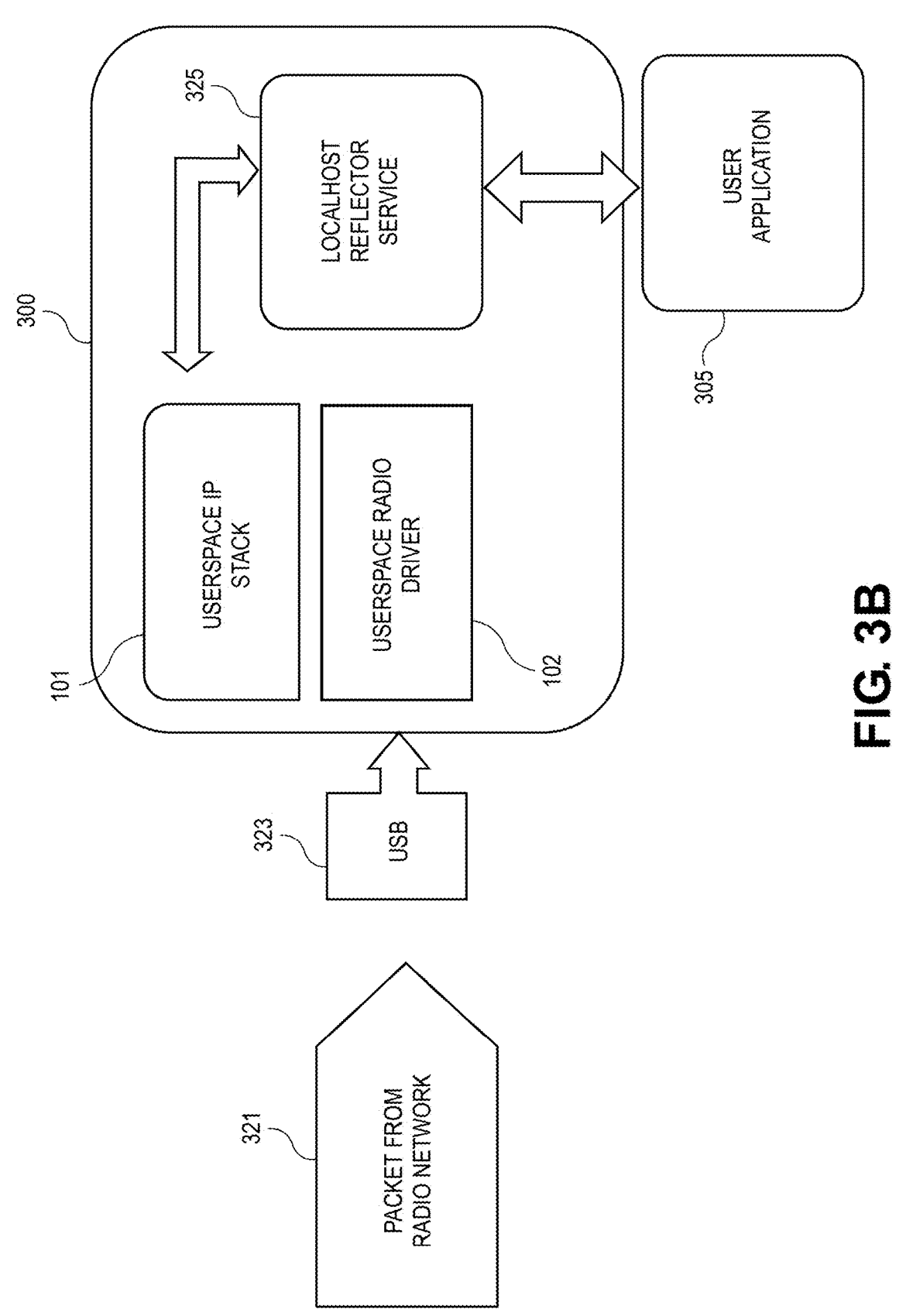
Figure 3C:
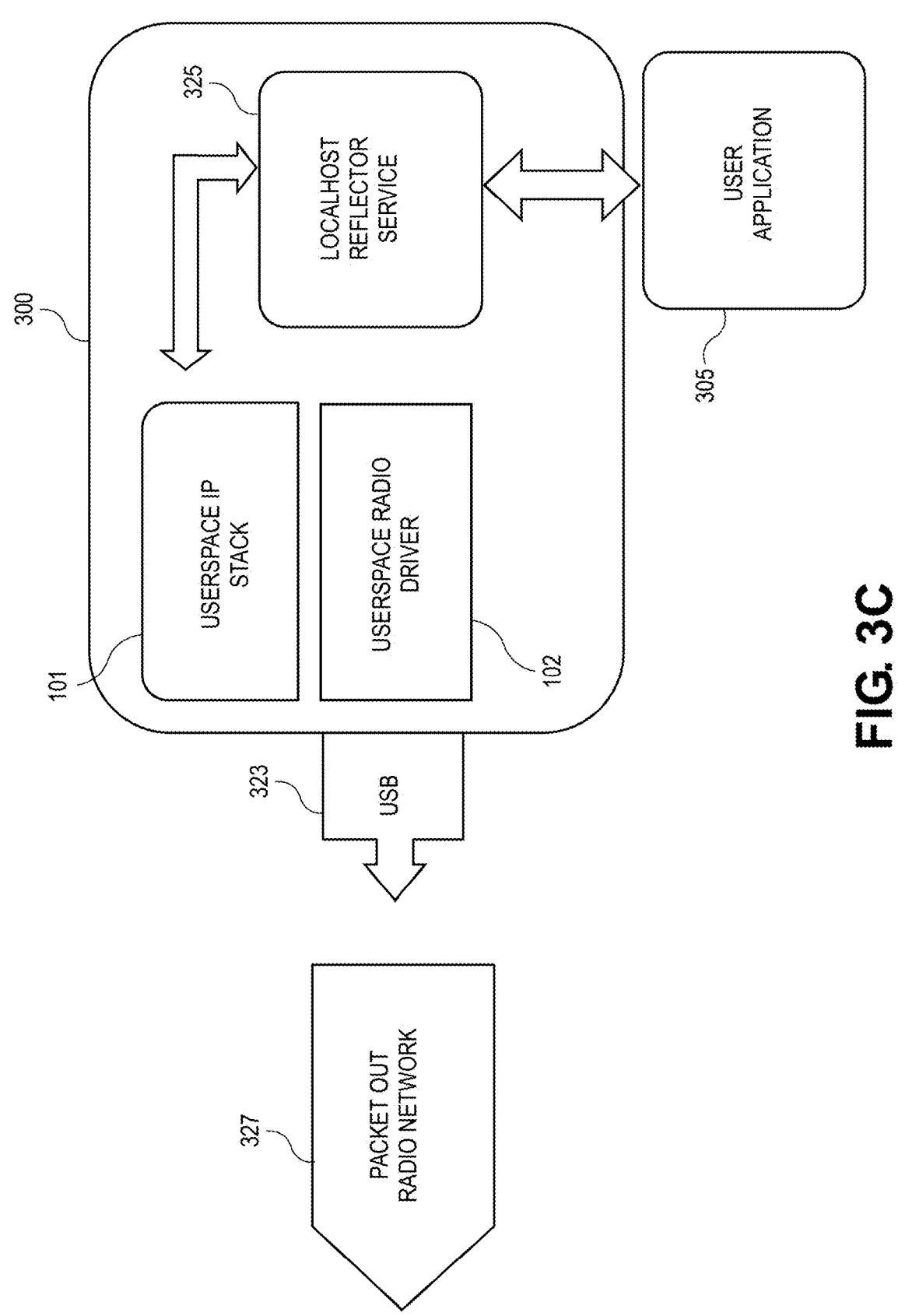

Referring now to FIGS. 3A-3C, an example of an overall architecture is shown with support for multiple network communications devices and peripheral devices attached. The application 300 includes one or more IP stacks 101 and peripheral device drivers 102 (102A/102B), such as, for example, but not limited to, external network device drivers such as radio drivers, sensor drivers, camera drivers, etc., for connecting to various hardware devices (e.g., communications devices) simultaneously or sequentially. A user application 305 exchanges or communicates information, such as IP data 301 and API control/data units or messages, with or via an IPC 106. The IPC 106 exchanges or communicates this information with an IPC mechanism or service 105 that provides the information (e.g., the messages 303) from the user application 305 to the userspace application 300. The EUD hardware API 307A/307B enables moving messages from the user application 305 to a network, for example. The userspace IP stack 101 and the userspace driver 102 (102A/ 102B) enable the messages to travel from the application 300 to the network hardware. The userspace IP stack supports, for example, but not limited to, address resolution protocol (ARP), PPP, Ethernet, and dynamic host configuration protocol (DHCP). In an aspect, the userspace IP stack 101 supports multiple OSI layers. IP stack functions can support Ethernet communications and other network functions that operate at the data link layer. In an aspect, external address resolution outside of the IP stack can be supported.

Referring now to FIGS. 3B and 3C, when a packet 321 (FIG. 3B) arrives from a network, in one embodiment, it is received at a USB/BLUETOOTH®/other physical layer transport port 323 and input to a userspace driver 102/ userspace IP stack 101. In an aspect, an IPC mechanism, such as a reflector service 325 (FIG. 3B), can enable messages to move to the user application 305 from the network. When a message arrives from the user application 305 into the userspace application 300, in some configurations, the message is received by a reflector service 325 that can enable messages to move from the user application 305 to the network through the userspace driver 102/userspace IP stack 101. In the userspace IP stack 101, the message is converted to a communications packet 327, and sent across the USB port 323 to the network.

Different types of IPCs can be used to move data into the userspace IP stack 101 (FIG. 3C) or in and out of application. The types of IPCs provide the mechanisms through which different processes (instances of executing programs) exchange data and coordinate with each other within a computer system. The IPC enables communication and synchronization between processes running concurrently on the same or different computers. An IPC type can include, but is not limited to including, pipes that provide a unidirectional communication channel between two related processes. One process writes data to a pipe, and other processes read the data. Pipes can be either anonymous or named. An IPC type can include sockets that provide bidirectional communication channels between processes over a network. Sockets allow processes to communicate with each other, either on the same machine or across a network. An IPC type can further include message queues that allow processes to communicate through messages exchanged between the processes. Messages are stored in message queues and can be accessed by multiple processes. This mechanism provides a way for processes to exchange data asynchronously. An IPC type can still further include shared memory that allows multiple processes to access a common area of memory. Shared memory enables efficient communication between processes because data can be written and read directly from shared memory without the need for copying. An IPC type can include remote procedure calls (RPCs) that enable a first process to execute procedures or functions in the address space of a second process, as if the first process were local. The RPC mechanism enables accessing functions across a network. An IPC type can include signals that enable interrupting execution based on the occurrence of an event. These IPC mechanisms provide different ways for processes to communicate and coordinate with each other, enabling the development of complex and distributed systems.

Figure 4:
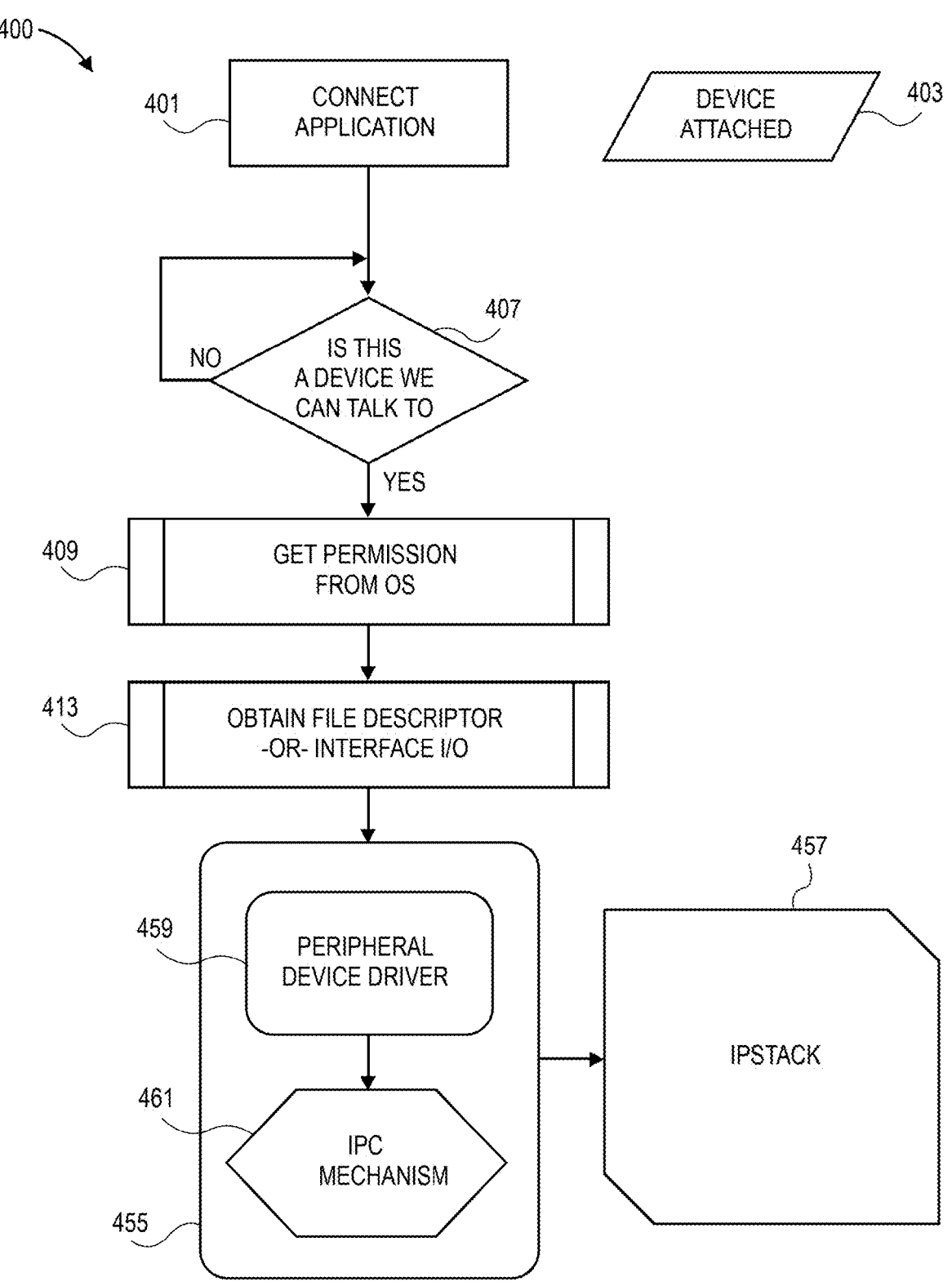
FIG. 4 is a flowchart of a method for processing packets in accordance with embodiments of the present disclosure.

Referring now to FIG. 4, shown is an IP stack configuration and processing flow chart in accordance with embodiments of the system and method of the present disclosure. In an aspect, an API is used to request permission to access hardware. In an aspect, the application 455 includes a device driver 459 and an IPC mechanism 461 communicating with a userspace IP stack 457. When a device 403 is attached, the operating system notifies the application 455. If 407, when the application 455 interrogates the connected device 403, the application 455 includes a device driver 459 for the attached device 403, the method 400 includes gaining 409 permissions to utilize the device 403. The permission request is sent to the operating system which allows the user to approve or deny access to the attached device 403. If 411 permission is obtained, the method 400 includes allowing 413 the application to access an I/O mechanism such as, for example, but not limited to, a file descriptor, that points to an input/output (I/O) interface associated with a device driver. The method 400 includes starting a new process or thread containing the device driver 459, and passing the file descriptor to the device driver 459. The device driver 459 then connects to the device 403 and initializes the device 403 using driver-specific parameters. When the initialization is complete, the device 403 can be utilized by the userspace IP stack 457. The device driver 459 notifies the userspace IP stack 457, via the IPC mechanism or service 461, that connection is possible. The device driver 459 provides parameters to the userspace IP stack 457 to establish an IP link (Layer 2 in OSI model).

Figure 5:
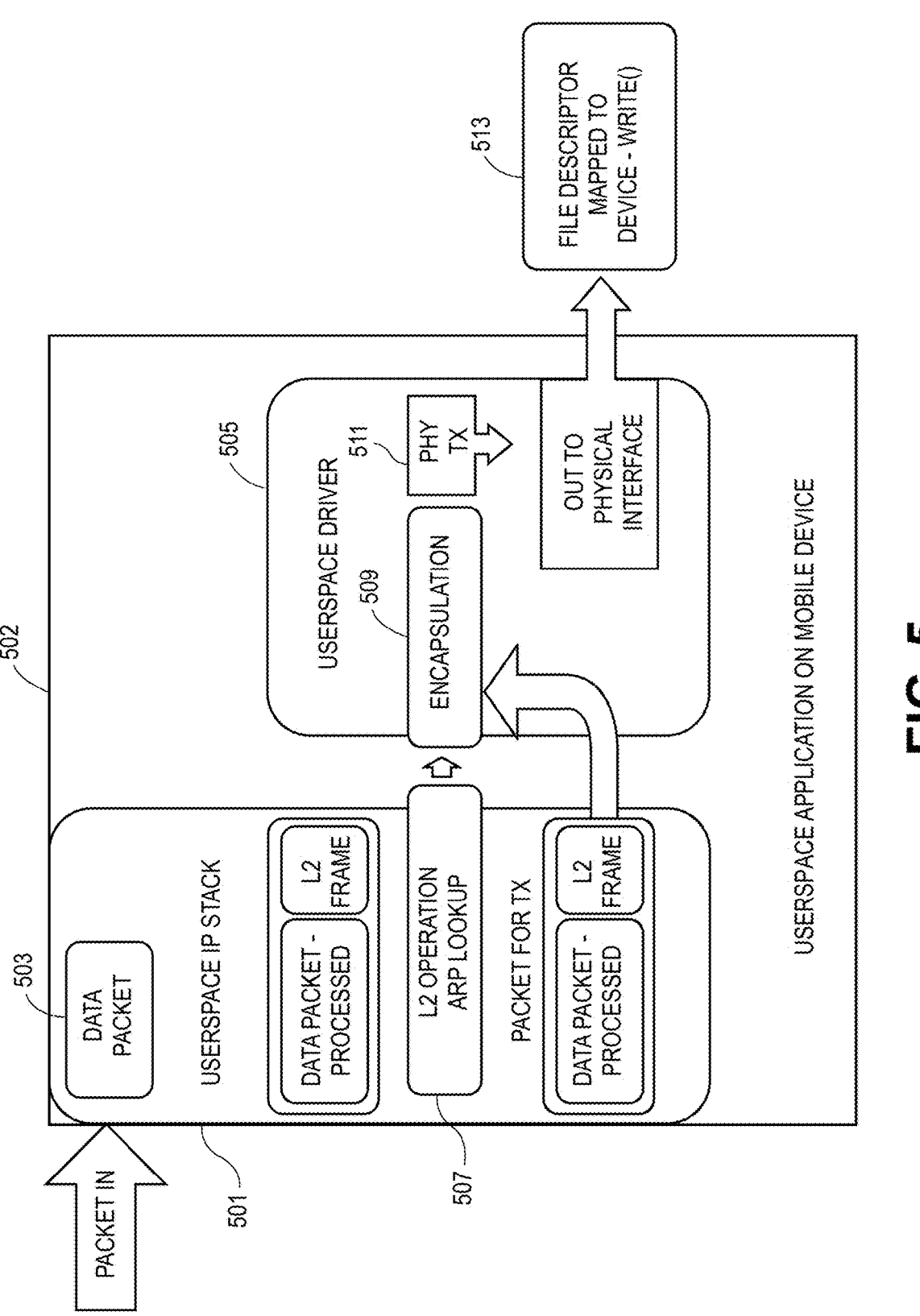
FIG. 5 is a schematic block diagram of an example of a userspace application on a user device showing packet reception from a user application, processing of the packet, and transmission of the packet to a physical interface.

Referring now to FIG. 5, shown is a description of packet flow from an IPC mechanism to a network device in accordance with embodiments of the system and method of the present disclosure. In an aspect, the data packet 503 is ingested using the IPC mechanism. The data packet 503 moves into the userspace IP stack 501 for processing. The userspace IP stack 501 prepares the data packet 503 for routing to one or more physical devices, the preparation including, for example, but not limited to, compressing the packet information and creating a lossy packet for low bandwidth network device transmission. In an aspect, the userspace IP stack 501 operates at the data link layer, for example, but not limited to, OSI model Layer 2. In an aspect, the data move across physical links through node-to-node data transfer with MAC address identification. In an aspect, an ARP request/lookup 507 is done by the userspace IP stack to determine Layer 2 routing. The data packet 503 is moved to the appropriate userspace device driver 505. The user-space device driver 505 encapsulates 509 the data packet 503 with the protocol information, and adds the payload. The userspace device driver transmits 511 the packet over the physical link, e.g. USB, BLUETOOTH®, or other.

Continuing to refer to FIG. 5, in another aspect, the data packet 503 is received into the application 502 from an external application. In some configurations, the data packet 503 is sent and received by the application 502, using localhost reflection via operating system sockets. The application 502 sends the received data packet 503 to the user-space IP stack 501 which manages output of the data packet 503, for example, but not limited to, by performing Layer 2 ARP, routing (if multiple interfaces are connected), and packet forwarding to the userspace device driver 505. The application 502 receives the output from the userspace IP stack 501 and reframes the data packet 503 with respect to a specific userspace device driver 505. The userspace device driver 505 sends the packet to the file descriptor/IO mechanism 513 to output to the device.

Figure 6:
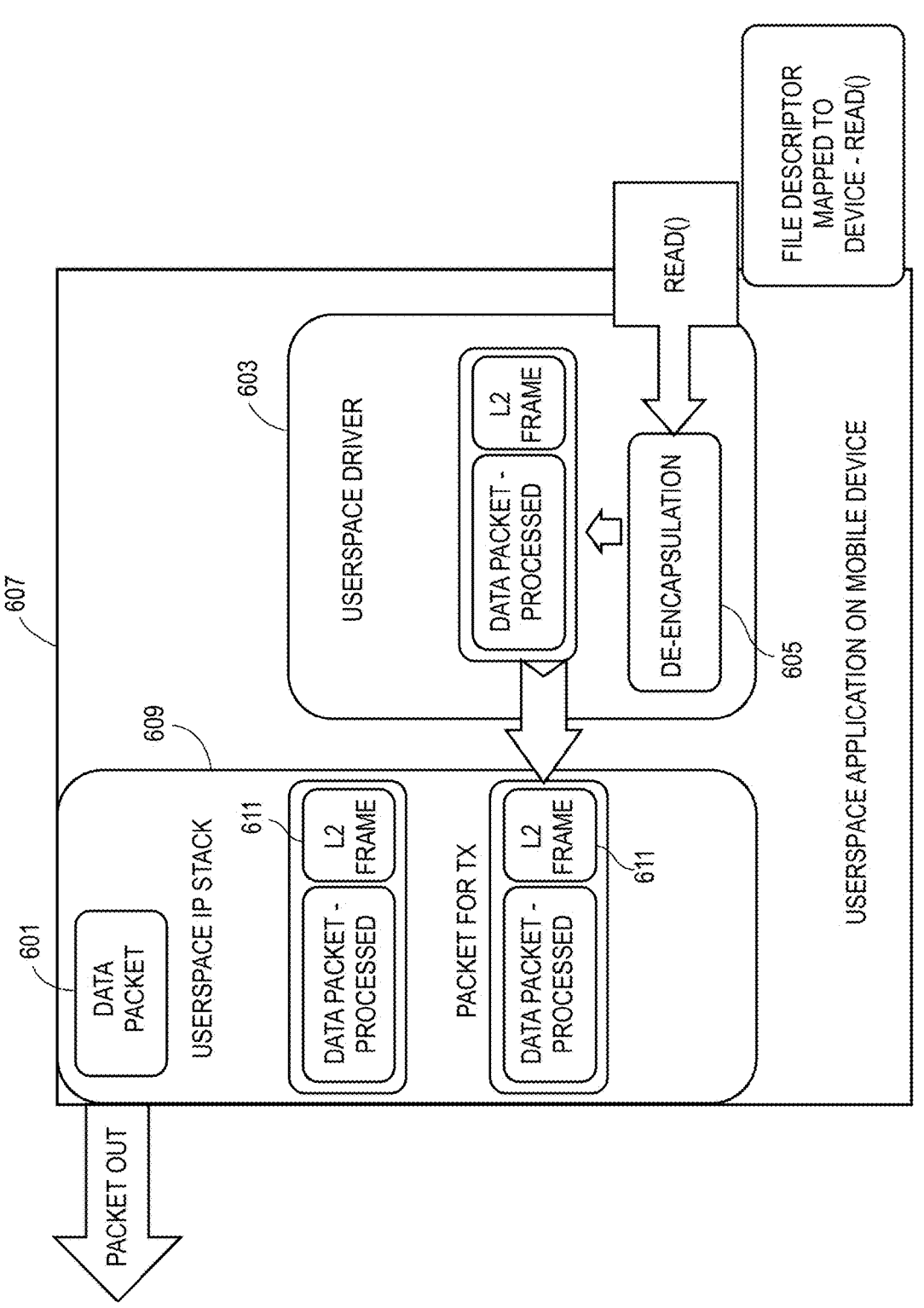
FIG. 6 is a schematic block diagram of an example of a userspace application on a user device showing packet reception from a physical communications device, processing of the packet, and transmission of the packet.

Referring now to FIG. 6, shown is a description of packet flow from a network device to an IPC mechanism in a user application 607 in accordance with embodiments of the system and method of the present disclosure. In an aspect, a network device reads the data packet from a physical link using the userspace device driver 603. The userspace device driver 603 de-encapsulates 605 the packet to create a Layer 2 frame 611. The Layer 2 frame 611 is pushed onto the userspace IP stack 609. The userspace IP stack 609 removes the Layer 2 encapsulation and moves to the IP packet to the IP data payload 601, which is transmitted via IPC, depending upon the packet's destination.

Figure 7:
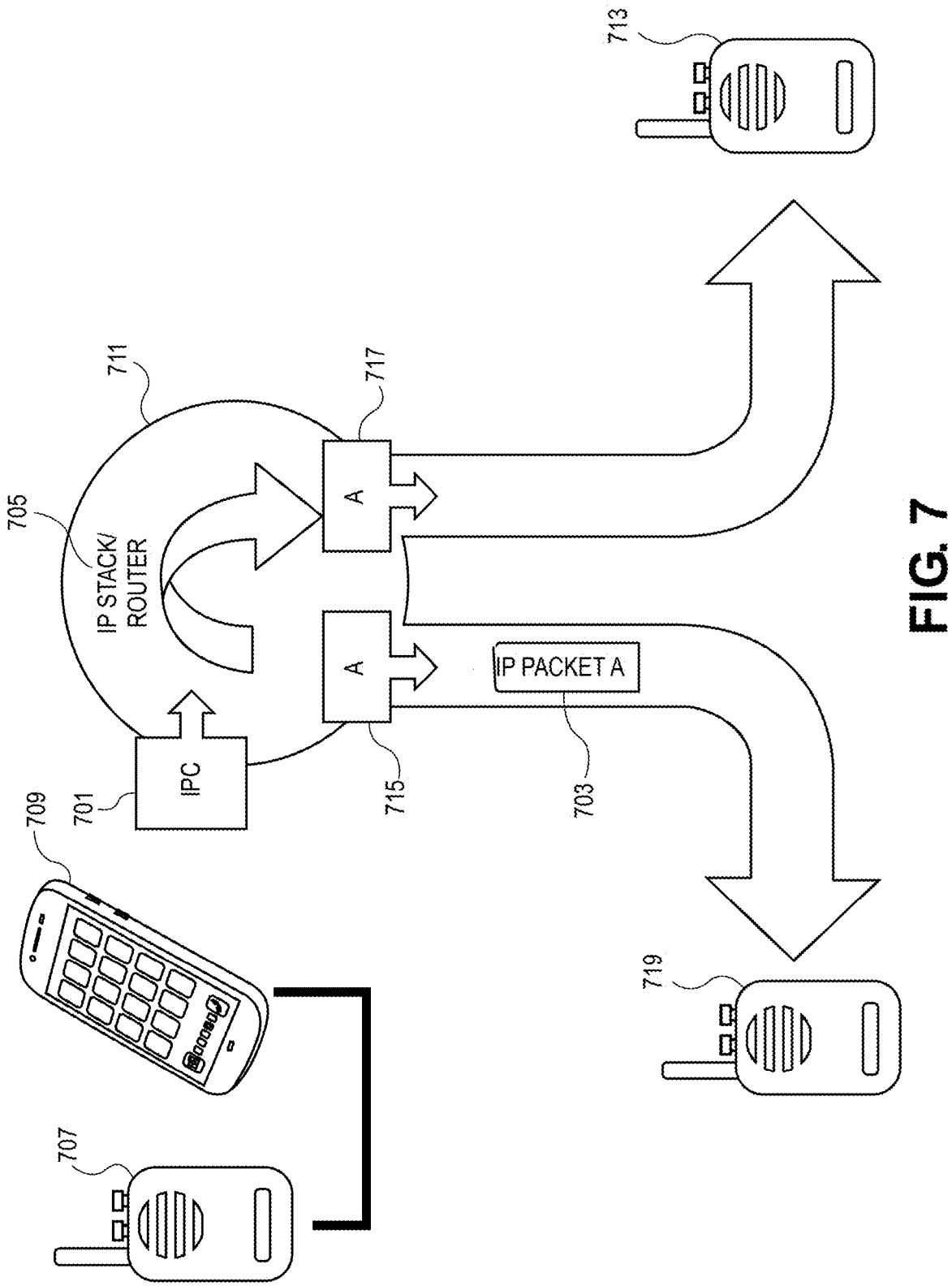
FIG. 7 is a pictorial representation of network routing flow of the system in accordance with embodiments of the present disclosure.

Referring now to FIG. 7, shown is a diagram of network routing flow, in accordance with embodiments of the system and method of the present disclosure. In this flow, the data packet 703 is ingested from the IPC mechanism 701 to the userspace IP stack 705, and a routing decision is made based on the IP destination. Shown is a tethered radio/network device 707 and a mobile device 709 with an application 711 in accordance with embodiments of the present disclosure executing thereon. An external application executing in the mobile device 709 sends data to the mobile/radio/network device application 713. The IPC mechanism 701 sends the data packet 703 to a peripheral driver that de-encapsulates the packet and sends it to the userspace IP stack 705. The IP stack 705 has network interfaces A 715 and B 717, and determines which route data packets 703 can take to, for example, but not limited to, mobile/radio/network device 713 or 719.

Referring now to FIG. 8, a method 800 for enabling a user-level interface between a communications device, (e.g., a wifi or BLUETOOTH® device, a USB port, or the like, for example, in a smartphone), and a user application executing on a user device (e.g., a smartphone running the Android OS, or the like), the user application including a userspace internet protocol (IP) stack, a userspace device driver, and an interprocess communication (IPC) mechanism includes, but is not limited to including, accessing 802 an input/output (I/O) mechanism, wherein the I/O mechanism points to an interface associated with the userspace device driver, wherein the userspace device driver is associated with the communications device, passing 804 the I/O mechanism to the userspace device driver, connecting 806 the userspace device driver to the userspace IP stack using the IPC, and initializing 808 the communications device.

The present disclosure has been described with reference to example implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

The invention claimed is:

1. A method for enabling a user-level interface between a communications device and a user application executing on a user device, via a userspace application including a userspace internet protocol (IP) stack, a userspace device driver, and an interprocess communication (IPC) mechanism, wherein the userspace application executes at a user level without requiring privileged operating system permissions to create a network interface and an associated routing table, the method comprising:

creating, by the userspace application while executing at the user level, the network interface and the routing table for the user device without requiring the privileged operating system permissions;

accessing an input/output (I/O) mechanism, wherein the I/O mechanism points to an interface associated with the userspace device driver, wherein the userspace device driver is associated with the communications device, and wherein the interface corresponds to the network interface created by the userspace application while executing at the user level;

passing the I/O mechanism to the userspace device driver;

connecting the userspace device driver to the userspace IP stack using the IPC mechanism; and initializing the communications device via the userspace device driver.

2. The method as in claim 1 further comprising:

requesting a first permission to access the communications device.

3. The method as in claim 2 further comprising:

using an applications programming interface to request the first permission from an operating system managing an execution of the user application.

4. The method as in claim 2 further comprising:

receiving, from a user, an approval or a denial of access to the communications device.

5. The method as in claim 1 further comprising:

receiving a notification that the communications device is attached to the user device.

6. The method as in claim 1 further comprising:

requesting a second permission to use the communications device when the user application includes a device driver for the communications device.

7. The method as in claim 1 further comprising:

starting a process or thread including the userspace device driver.

8. The method as in claim 1 further comprising:

providing connection information to the userspace IP stack, wherein the connection information includes parameters used to establish an IP link between the communications device and the user device.

9. The method as in claim 1 wherein the I/O mechanism comprises:

a file descriptor.

10. A system for enabling a user-level network interface between a communications device and a user application executing on a user device, via a userspace application, wherein the userspace application executes at a user level without requiring privileged operating system permissions to create a network interface and an associated routing table, the system comprising:

the userspace application executing on the user device, the userspace application including a userspace internet protocol (IP) stack, a userspace device driver, and an interprocess communication (IPC) mechanism, wherein the userspace application includes instructions to perform operations including:

creating, by the userspace application while executing at the user level, the network interface and the routing table for the user device without requiring the privileged operating system permissions;

accessing an input/output (I/O) mechanism, wherein the I/O mechanism points to an interface associated with the userspace device driver, wherein the userspace device driver is associated with the communications device, and wherein the interface corresponds to the network interface created by the userspace application while executing at the user level;

passing the I/O mechanism to the userspace device driver;

connecting the userspace device driver to the userspace IP stack using the IPC mechanism; and initializing the communications device via the userspace device driver.

11. The system as in claim 10 further comprising:

a router configured to intercept communications packets transmitted by a user application.

12. The system as in claim 10 wherein the userspace application is configured to access the communications device using an applications programming interface (API) configured to enable control of the communications device.

13. The system as in claim 10 wherein the operations further comprise:

ingesting a packet into the userspace application via the IPC mechanism;

moving the packet into the userspace IP stack;

preparing, by the userspace IP stack, the packet for transmission by the communications device; and moving the prepared packet to the userspace device driver configured to transmit the packet over a physical link associated with the communications device, wherein the userspace application executes at a user-level without requiring non-user-level permissions.

14. The system as in claim 10 wherein the operations further comprise:

reading, by the communications device, a packet using the userspace device driver;

forming a data link layer frame including data link layer encapsulation from the packet;

pushing the data link layer frame onto the userspace IP stack;

determining a data payload by removing the data link layer encapsulation from the packet; and transmitting the data payload to a consumer of the data payload.

15. The system as in claim 14 wherein the operations further comprise:

transmitting the data payload using the userspace IPC mechanism.

16. A non-transitory computer-readable medium storing instructions for enabling a user-level interface between a communications device and a user application executing on a user device, via a userspace application including a userspace internet protocol (IP) stack, a userspace device driver, and an interprocess communication (IPC) mechanism, wherein the userspace application executes at a user level without requiring privileged operating system permissions to create a network interface and an associated routing table, the instructions configured to be executed by a processor, the instructions comprising:

creating, by the userspace application while executing at the user level, the network interface and the routing table for the user device without requiring the privileged operating system permissions;

accessing an input/output (I/O) mechanism, wherein the I/O mechanism points to an interface associated with the userspace device driver, wherein the userspace device driver is associated with the communications device, and wherein the interface corresponds to the network interface created by the userspace application while executing at the user level;

passing the I/O mechanism to the userspace device driver;

connecting the userspace device driver to the userspace IP stack using the IPC mechanism; and initializing the communications device via the userspace device driver.

17. The non-transitory computer-readable medium as in claim 16 wherein the instructions comprise:

ingesting a packet into the userspace application via the IPC mechanism;

moving the packet into the userspace IP stack;

preparing, by the userspace IP stack, the packet for transmission; and moving the prepared packet to the userspace device driver configured to transmit the packet over a physical link associated with the communications device, wherein the userspace application executes at a user-level without requiring non-user-level permissions.

18. The non-transitory computer-readable medium as in claim 16 wherein the instructions comprise:

reading, by the communications device, a packet from a physical link using the userspace device driver;

forming a data link layer frame including data link layer encapsulation from the packet;

pushing the data link layer frame onto the userspace IP stack;

determining a data payload by removing the data link layer encapsulation from the packet; and transmitting the data payload to a consumer of the data payload.

19. The non-transitory computer-readable medium as in claim 18, the instructions further comprising:

transmitting the data payload using the userspace IPC mechanism.

20. The non-transitory computer-readable medium as in claim 16 wherein the userspace application is configured to access the communications device using an applications programming interface (API) configured to enable control of the communications device.

\* \* \* \* \*